United States Patent
Ballew et al.

(10) Patent No.: US 8,144,697 B2
(45) Date of Patent: Mar. 27, 2012

(54) SYSTEM AND METHOD FOR NETWORKING COMPUTING CLUSTERS

(75) Inventors: James D. Ballew, Grapevine, TX (US); Shannon V. Davidson, Hillsboro, TX (US)

(73) Assignee: Raytheon Company, Waltham, MA (US)

( * ) Notice: Subject to any disclaimer, the term of this patent is extended or adjusted under 35 U.S.C. 154(b) by 934 days.

(21) Appl. No.: 11/622,921

(22) Filed: Jan. 12, 2007

(65) Prior Publication Data

US 2008/0170581 A1  Jul. 17, 2008

(51) Int. Cl.
H04L 12/50 (2006.01)
H04L 12/56 (2006.01)

(52) U.S. Cl. ......................................... 370/386; 370/401
(58) Field of Classification Search .................. 370/250, 370/251, 360, 370, 372, 386–388, 398, 400, 370/401
See application file for complete search history.

(56) References Cited

U.S. PATENT DOCUMENTS

| 7,061,907 B1 | 6/2006 | Hsieh et al. | 370/360 |
| 7,406,038 B1* | 7/2008 | Oelke et al. | 370/225 |
| 2002/0093950 A1* | 7/2002 | Li | 370/360 |
| 2002/0159437 A1* | 10/2002 | Foster et al. | 370/351 |
| 2003/0169734 A1* | 9/2003 | Lu et al. | 370/386 |
| 2004/0085897 A1* | 5/2004 | Jacobi et al. | 370/229 |
| 2005/0173357 A1* | 8/2005 | McClain et al. | 211/26 |
| 2007/0172235 A1* | 7/2007 | Snider et al. | 398/45 |
| 2007/0253437 A1* | 11/2007 | Radhakrishnan et al. | 370/401 |

FOREIGN PATENT DOCUMENTS

EP  1 737 253 A1  12/2006

OTHER PUBLICATIONS

PCT; "Invitation to Pay Additional Fees and, Where Applicable, Protest Fee"; PCT/US2007/088091 (7 pages), Mar. 7, 2008.
Logan G. Harbaugh, "Building High-Performance Linux Clusters, Sponsored by Appro," High Performance Computing, XP-002480128, 23 pages, Jun. 2004.
European Patent Office Communication Pursuant to Article 94(3) EPC re: Office Action deficiencies for Application No. 07 865 860. 6-2416, Ref. JL53829P.EPP, (3 pgs), Oct. 27, 2010.

* cited by examiner

Primary Examiner — Hong Cho
(74) Attorney, Agent, or Firm — Cantor Colburn LLP

(57) ABSTRACT

In certain embodiments, a method for networking a computer cluster includes communicatively coupling together each of a plurality of client nodes through one or more switches, each switch comprising a plurality of switch ports. The method also includes positioning at least two of the one or more switches inside a switch package. In addition, the method includes electrically interconnecting at least a subset of the plurality of switch ports of the at least two of the one or more switches within the switch package.

20 Claims, 3 Drawing Sheets

SYSTEM AND METHOD FOR NETWORKING COMPUTING CLUSTERS

TECHNICAL FIELD

This invention relates generally to networking computing clusters and, in particular, networking computing clusters using a switch package.

BACKGROUND

The computing needs for high performance computing continues to grow. Commodity processors have become powerful enough to apply to some problems, but often must be scaled to thousands or even tens of thousands of processors in order to solve the largest of problems. However, traditional methods of interconnecting these processors to form computing clusters are problematic for a variety of reasons. For example, some conventional interconnecting switches have limited scalability and fault tolerance characteristics that inadequately take advantage of low cost commodity computers.

SUMMARY OF THE EXAMPLE EMBODIMENTS

In certain embodiments, a method for networking a computer cluster includes communicatively coupling together each of a plurality of client nodes through one or more switches, each switch comprising a plurality of switch ports. The method also includes positioning at least two of the one or more switches inside a switch package. In addition, the method includes electrically interconnecting at least a subset of the plurality of switch ports of the at least two of the one or more switches within the switch package.

Particular embodiments of the present invention may provide one or more technical advantages. Some embodiments include a network fabric having highly compact and modular switch packages that provide a more flexible, optimized, and cost-efficient solution for building high performance computing arrays. In addition, in some embodiments the switch packages may have a compact form factor and enhanced accessibility that is compatible with commodity computing equipment. Various embodiments may support network connections that have a higher bandwidth than the direct computer connections.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DESCRIPTION OF EXAMPLE EMBODIMENTS

In accordance with the teachings of the present invention, a system and method for networking computer clusters are provided. By utilizing a modular switch package, particular embodiments may provide a more flexible, optimized, and cost-efficient solution for building high performance computing arrays. Embodiments of the present invention and its advantages are best understood by referring to FIGS. 1 through 3C of the drawings, like numerals being used for like and corresponding parts of the various drawings. Particular examples specified throughout this document are intended for example purposes only, and are not intended to limit the scope of the present disclosure. Moreover, the illustrations in FIGS. 1 through 3C are not necessarily drawn to scale.

Figure 1:
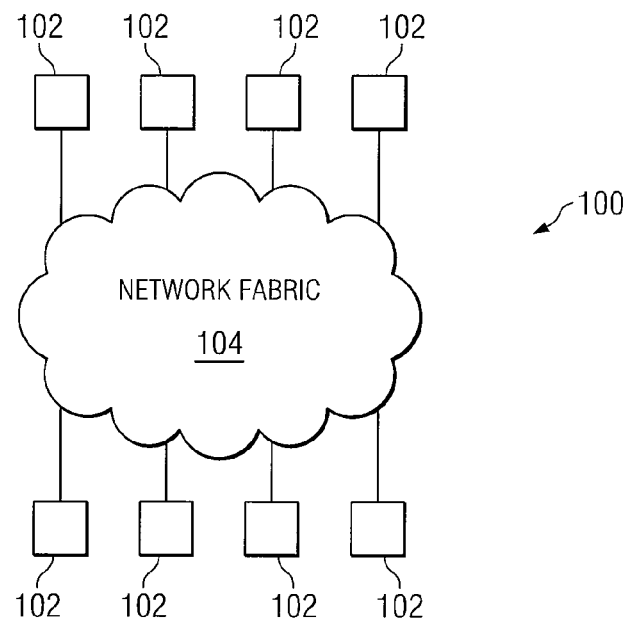
FIG. 1 is a block diagram illustrating an example embodiment of a portion of a computer cluster.

FIG. 1 is a block diagram illustrating an example embodiment of a portion of a computing cluster 100. Computing cluster 100 generally includes a plurality of client nodes 102 interconnected by a network fabric 104. As will be shown, the network fabric 104 in some embodiments of the present invention may include a plurality of standardized, compact, and modular switch packages that can be used to construct large scale, fault tolerant, and high performance computing clusters using commodity computers coupled at each of the plurality of client nodes 102.

Client nodes 102 generally refer to any suitable device or devices operable to communicate with each other through network fabric 104, including one or more of the following: switches, processing elements, memory elements, and I/O elements. In the example embodiment, client nodes 102 include commodity computers. Network fabric 104 generally refers to any interconnecting system capable of transmitting audio, video, signals, data, messages, or any combination of the preceding. In this particular embodiment, network fabric 104 comprises a plurality of switches interconnected by copper cables.

Supercomputers and fat-tree network clusters are generally used to solve large-scale computing problems. Some computing clusters are scaled to thousands and even tens of thousands of processors in order to solve the largest of problems. Conventional network computing arrays typically include multiple network array switches, each switch individually packaged within a rack-mountable 1U enclosure having 24-port connectors physically positioned on one side of the package. In addition, conventional computing networks are typically formed using fat-tree architectures. However, such conventional computing clusters are problematic for a variety of reasons. For example, this type of network fabric typically does not scale well, has limited performance due in part to long cable lengths, typically has a short mean time between failure ("MTBF"), and is often cost prohibitive.

Accordingly, teachings of some of the embodiments of the present invention recognize a network fabric including highly compact and modular switch packages may provide a more flexible, optimized, and cost-efficient solution for building high performance computing arrays using commodity computers. In various embodiments, the modular switch packages may support multi-dimensional, mesh network arrays with network connections inside and outside of the switch package, thereby reducing the number of external cables and space requirements for the network fabric. In addition, the network connections of various embodiments may support a higher bandwidth than the direct computer connections. As will be shown, the switch packages of some embodiments may have enhanced switch density and accessibility, thereby maximizing the space available to commodity computing equipment. In various embodiments, the switch packages are modular in that they may be configured to support any of a variety of network cluster architectures.

According to the teachings of the invention, in some embodiments certain of these advantages are achieved by enclosing a plurality of switches within the switch package, communicatively coupling together each of the switches within the switch package, and providing interfaces to the switches on opposite sides of the switch package. In addition, in some embodiments certain of these advantages are achieved by coupling one or more modular daughter cards to each switch package, the daughter cards configurable for particularized needs.

Figure 2A:
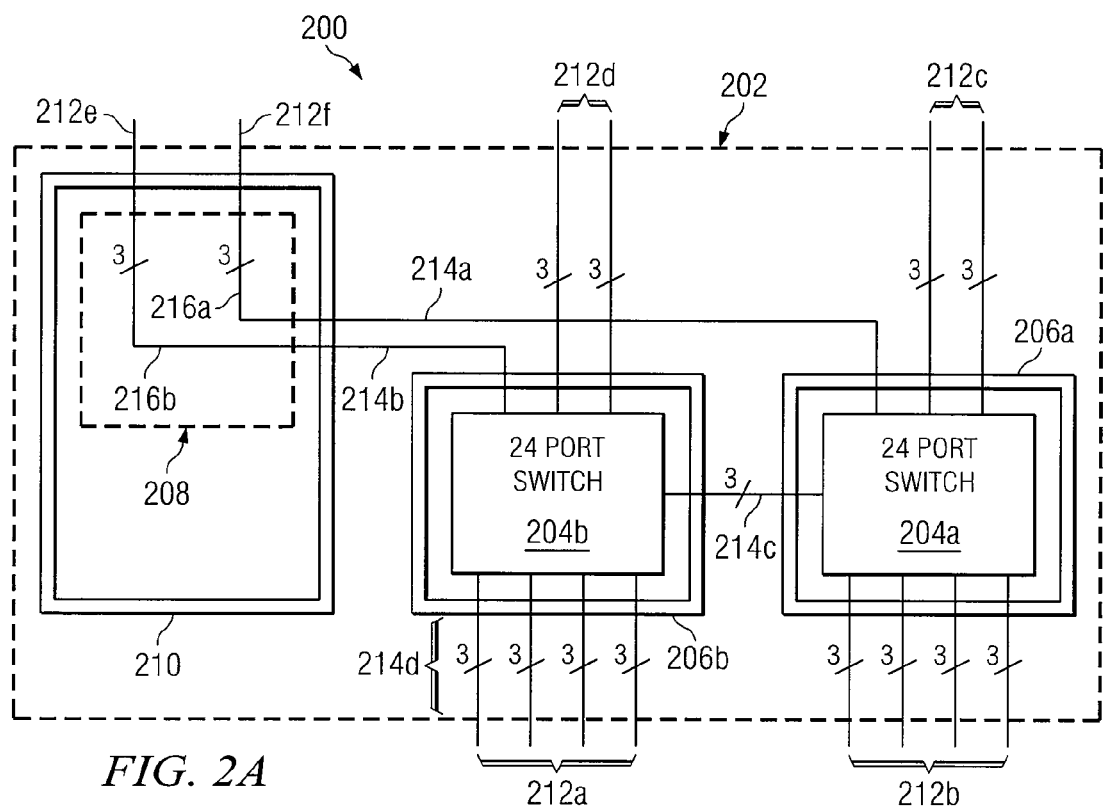
FIG. 2A is a block diagram illustrating one embodiment of a portion of a modular network switch package that may form a portion of the computer cluster of FIG. 1.
Figure 2B:
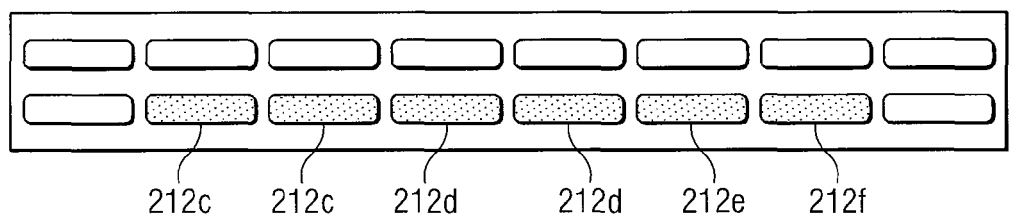
FIG. 2B is a side view illustrating one embodiment of a front face of the modular network switch package of FIG. 2A.
Figure 2C:
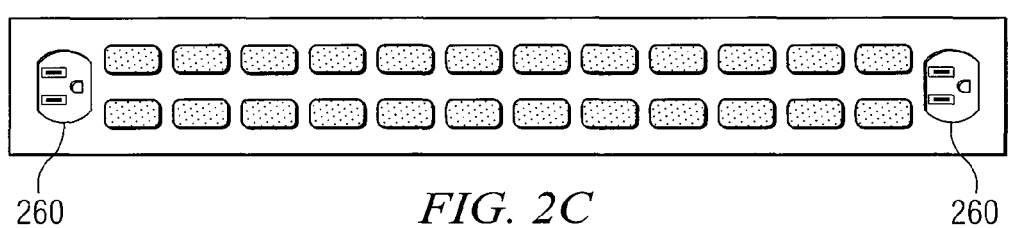
FIG. 2C is a side view illustrating one embodiment of a back face of the modular network switch package of FIG. 2A.
Figure 3B:
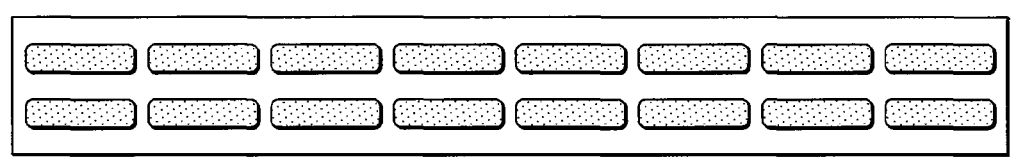
FIG. 3B is a side view illustrating one embodiment of a front face of the modular network switch package of FIG. 3A.
Figure 3C:
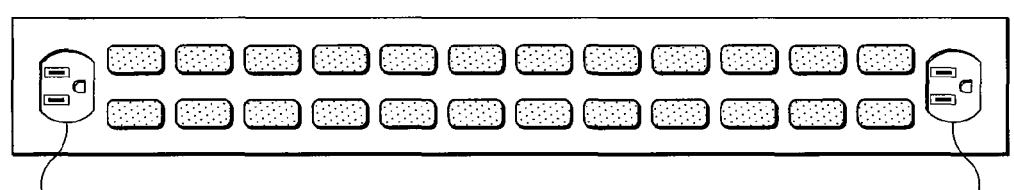
FIG. 3C is a side view illustrating one embodiment of a back face of the modular network switch package of FIG. 3A.
Figure 3A:
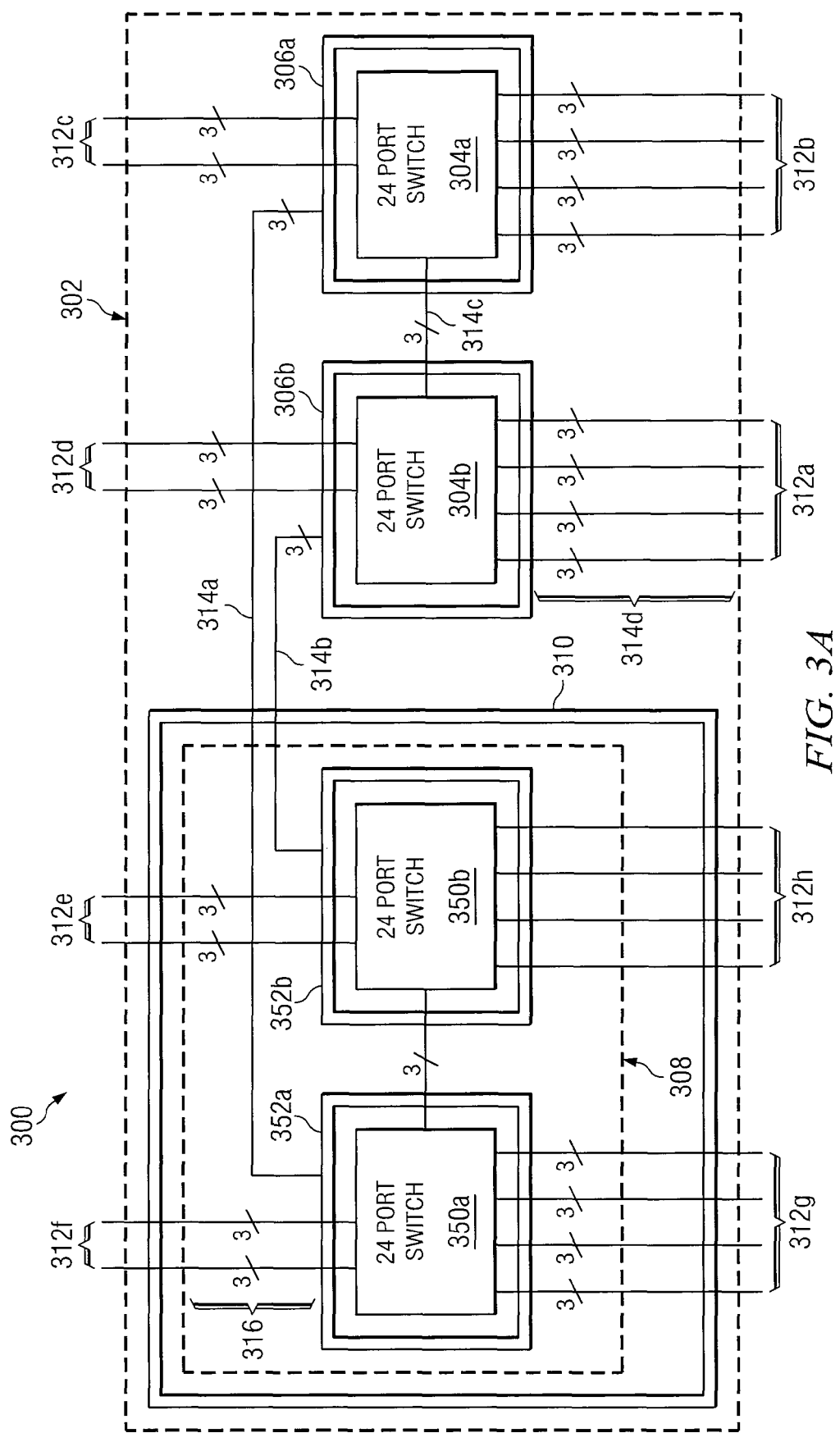
FIG. 3A is a block diagram illustrating one embodiment of a portion of a modular network switch package that may form a portion of the computing cluster of FIG. 1.

An example embodiment of a modular switch package operable to support, for example, single-rail, single-dimensional and/or two-dimensional network cluster architectures is illustrated in FIGS. 2A through 2C, while FIGS. 3A through 3C illustrate an example embodiment of a modular switch package operable to support, for example, two-dimensional or three-dimensional network architectures.

FIG. 2A is a block diagram illustrating one embodiment of a portion of a modular network switch package 200 that may form a portion of the network fabric 104 of FIG. 1. Switch package 200 generally provides a standardized, compact network switch that can be used to construct very large scale, fault tolerant, and high performance computing clusters, such as the computing cluster 100 of FIG. 1. In this particular embodiment, switch package 200 is operable to support, for example, dual-rail, one-dimensional, and/or two-dimensional network cluster architectures. Switch package 200 generally includes the following components attached to a common motherboard 202: a plurality of switches 204 coupled to respective switch receptors 206, one or more daughter cards 208 coupled to respective daughter card receptors 210, and a plurality of interfaces 212. As explained further below, in various embodiments, switch package 200 and associated components, including multiple switch 204 nodes, may all fit within a standard 1U enclosure having interfaces on both sides of the enclosure. In such embodiments, the 1U enclosure may be operable to mount horizontally in a standard nineteen-inch equipment rack. In addition, such embodiments may greatly enhance the networking capability and routing density associated with space typically dedicated to a standard 1U enclosure. A more detailed description of example physical layouts for a 1U enclosure is explained further below with reference to FIGS. 2B, 2C, 3B and 3C.

Motherboard 202 generally refers to any suitable circuit board having connectors 214 and receptors 206 and 210 that together make up at least a portion of an electronic system. Connectors 214 generally refer to any interconnecting medium capable of transmitting audio, video, signals, data, messages, or any combination of the preceding. In this particular embodiment, connectors 214 are communicative paths or traces that electrically couple the switch receptors 206, the daughter card receptor 210, and the interfaces 212 as shown. Although illustrated as a single line for simplicity, in this particular embodiment, each connector 214 actually comprises three independent connectors. Connectors 214 may be formed, for example, using photolithographic techniques on a surface of motherboard 202. Switch receptors 206 and daughter card receptor 210 generally refer to any mounting surface or socket operable to receive and electrically couple to switches 204 and daughter cards 208 respectively.

Switches 204 generally refer to any device capable of routing between respective switch ports any audio, video, signals, data, messages, or any combination of the preceding. In this particular example embodiment, switches 204a and 204b are each 24-port Infiniband switches mounted on switch receptors 206a and 206b respectively; however, any appropriate switch or router may be used. Each switch 204a and 204b comprises an integrated circuit that allows communication between each of the respective switch ports. For example, switch 204a may route data from connectors 214d to connectors 214c. Although the switches 204 in this example each have twenty-four ports, any appropriate number of ports may be used without departing from the scope of the present disclosure. Connectors 214c enable communication between switch 204a and 204b, the communication internal to switch package 200. Thus, switch nodes 204a and 204b are able to communicate without the use of external interfaces 212 and associated cabling, which enhances bandwidth capabilities and simplifies network fabric 104 implementation. Connectors 214a, 214b, and 214d enable communication between each switch 204 and a plurality of interfaces 212.

Interfaces 212 generally enable switch package 200 to communicate externally. In this particular embodiment, interfaces 212 include twenty-four client interfaces 212a and 212b and four network interfaces 212c and 212d; however, any appropriate number of interfaces may be used. Each client interface 212a and 212b is a 4X Infiniband port that can be coupled to a commodity computer; however, other types of interfaces may be used. In addition, each 4X Infiniband port is associated with one port of a respective 24-port switch 204. However, as described further below, interfaces 212a and 212b may alternatively use, for example, 12X Infiniband connectors for higher density or any other appropriate connector. Each network interface 212c, 212d, 212e, and 212f is a 12X Infiniband port that can be coupled to other switch packages; however, other types of interfaces may be used. Each 12X Infiniband port is associated with three switch ports of a respective switch 204a or 204b. In this particular example configuration, a daughter card 208 mounts on motherboard 202 to provide two additional network interfaces 212e and 212f, each interface 212e and 212f a 12X Infiniband port; however, other types and/or numbers of interfaces may be used.

Daughter card 208 generally refers to any secondary circuit board capable of coupling to daughter card receptor 210. In this particular embodiment, daughter card receptor 210 is operable to receive any of a variety of daughter cards 208, thus providing a modular switch package 200 that may be configured and optimized to any particular need or network architecture. As described below with reference to FIG. 3A, the daughter card 208 of various embodiments may include one or more switches mounted to the daughter card 208. However, in this particular embodiment, daughter card 208 comprises connectors 216a and 216b that respectively enable communication between interfaces 212e and 212f and connectors 214a and 214b. Various other embodiments may not include a daughter card 208 and associated daughter card receptor 210. For example, in various other embodiments, connectors 214a and 214b may couple directly to interfaces 212e and 214f respectively without coupling to connectors 216a and 216b within a daughter card 208. In such embodiments, connectors 216a and 216b may be, for example, traces on motherboard 202.

As shown in FIG. 2A, interfaces 212c, 212d, 212e and 212f are physically positioned on opposite sides of switch package 200 from interfaces 212a and 212b. Thus, in this particular embodiment, two different sides of switch package 200 are used for connections to maximize the density of interfaces 212. Example embodiments of the physical layout of interfaces 212 are illustrated in FIGS. 2B and 2C respectively.

FIG. 2B is a side view illustrating one embodiment of the front of the modular network switch package 200 of FIG. 2A. In this particular embodiment, switch package 200 fits within a standard 1U enclosure operable to mount horizontally in a standard nineteen-inch equipment rack. Each of the motherboard 202, daughter card 208, and switches 204 fit within the 1U enclosure of switch package 200. As shown in FIG. 2B, the front of switch package 200 generally includes six 12X Infiniband interfaces 212c, 212d, 212e, and 212f, each operable to provide connections to other switch packages; however, other types and/or numbers of interfaces may be used. In various embodiments, multiple interconnected switch packages 200 may form at least a portion of the network array fabric 104 of FIG. 1. As shown in FIG. 2C, the back of switch package 200 generally includes twenty-four 4X Infiniband client interfaces 212a and 212b, each operable to provide connections to the HCA port of a computer (not explicitly shown); however, other types and/or numbers of interfaces may be used. In various embodiments, the computers may be mounted in the same equipment rack. In this particular embodiment, the back of switch package 200 also includes two power jacks 260.

Switch package 200 may support any of a variety of network architectures. For example, switch package 200 may support two-dimensional and/or dual-rail architectures by interconnecting switch package 200 with other similarly configured switch packages 200 using network interfaces 212c, 212d, 212e, and 212f. However, various other embodiments may use alternative switch package 200 configurations to support other network architectures. For example, switch package 200 may interconnect with other similarly configured switch packages 200 to form one-dimensional network architecture. The one-dimensional network architecture may have individual switch nodes 204a and 204b extending theoretically in positive and negative directions along a single axis. To illustrate, in some embodiments, switches 204a and 204b may communicate with other respective switch packages 200 through interfaces 212e and 212f respectively. The remaining interfaces 212a, 212b, 212c, and 212d may include a total of thirty-six 4X Infiniband connections, enabling each switch 204a and 204b in the one-dimensional network configuration to communicate with up to eighteen client nodes; however, connections other than 4X Infiniband may be used.

Switch package 200 supports multi-dimensional arrays with network connections both inside and outside the switch package 200 enclosure, in one embodiment. The modular daughter card receptor 210 and associated daughter card 208 enables alternative configurations with greater complexity than what is illustrated in FIG. 2A. For example, in various other embodiments, switch package 200 may be alternatively configured with a daughter card 208 operable to additionally support three-dimensional network architecture, as illustrated in FIGS. 3A and 3B.

FIG. 3A is a block diagram illustrating an alternative embodiment of a portion of a modular network switch package 300 that may form a portion of the network fabric 104 of FIG. 1. This particular embodiment differs from the example embodiment illustrated in FIG. 2A in that switch package 300 more conveniently supports various network configurations, including, for example, dual-rail, two-dimensional and/or three-dimensional network cluster architectures. Switch package 300 generally provides a standardized, compact network switch that can be used to construct very large scale, fault tolerant, and high performance computing clusters, such as the computing cluster 100 of FIG. 1. Switch package 300 generally includes the following components coupled to a common motherboard 302: a plurality of switches 304 coupled to respective switch receptors 306, one or more daughter cards 308 coupled to respective daughter card receptors 310, and a plurality of interfaces 312. As explained further below, in various embodiments, switch package 300 and associated components, including multiple switch 204 nodes, may all fit within a standard 1U enclosure having interfaces on both sides of the enclosure. In such embodiments, the 1U enclosure may be operable to mount horizontally in a standard nineteen-inch equipment rack. In addition, such embodiments may greatly enhance the networking capability and routing density associated with space typically dedicated to a standard 1U enclosure. A more detailed description of example physical layouts for a 1U enclosure is explained further below with reference to FIGS. 3B and 3C.

One difference between the example embodiments of FIG. 3A and FIG. 2A is the configuration of daughter card 308 and respective interfaces 312e, 312f, 312g, and 312h. The other features of switch package 300 are substantially similar to respective features of switch package 200. That is, motherboard 302, daughter card receptor 310, switches 304, switch receptors 306, connectors 314a, 314b, 314c, and 314d and interfaces 312a, 312b, 312c, and 312d are substantially similar in structure and function to motherboard 202, daughter card receptor 210, switches 204, switch receptors 206, connectors 214a, 214b, 214c, and 214d and interfaces 212a, 212b, 212c, and 212d respectively of FIG. 2A. Various other embodiments may not include a modular daughter card 208 and associated daughter card receptor 210. For example, in various other embodiments, connectors 314a and 314b may communicatively couple to switch receptors 352a and 352b respectively and/or switches 350a and 350b respectively without communicatively coupling to connectors 316 within a daughter card 208. In such embodiments, connectors 310 may simply be, for example, traces on motherboard 302.

In the example embodiment of FIG. 3A, the support of a three-dimensional network architecture may be effected by replicating the base design of FIG. 2A onto a printed circuit board of daughter card 308. That is, daughter card 308 includes two 24-port Infiniband switches 350a and 350b coupled by switch receptors 352a and 352b to connectors 310; however, other types and/or numbers of interfaces may be used. In addition, daughter card 308 couples switches 350a and 350b to interfaces 312g and 312h respectively, thus doubling the network connectivity of switch package 300 over that of switch package 200. In operation, each switch 304a, 304b, 350a, and 350b may communicate with each other switch 304a, 304b, 350a, and 350b within switch package 300. In addition, each switch 304a, 304b, 350a, and 350b may communicate with up to six client nodes through respective interfaces 312c, and 312d, 312e, and 312f. Examples embodiments of the physical layout of interfaces 312 are illustrated in FIGS. 3B and 3C respectively.

FIG. 3B is a side view illustrating one embodiment of the front of the modular network switch package 300 of FIG. 3A. In this particular embodiment, switch package 200 comprises a standard 1U enclosure operable to mount horizontally in a standard nineteen-inch equipment rack. Each of the motherboard 302, daughter card 308, and switches 304 and 350 may fit within the 1U enclosure of switch package 300. As shown in FIG. 3B, the front of switch package 300 generally includes sixteen 12X Infiniband interfaces 312a, 312b, 312g and 312h, each operable to provide connections to other network switch packages; however, other types of and/or numbers of interfaces may be used. As shown in FIG. 3C, the back of switch package 300 generally includes twenty-four 4X Infiniband interfaces 212c, 212d, 212e and 212f, each operable to provide connections to the HCA port on a computer (not explicitly shown); however, other types and/or numbers of interfaces may be used. In various embodiments, the computers may be mounted in the same equipment rack.

Switch packages 300 may be configured and interconnected in any of a variety of network cluster architectures. For example, pairs of switch packages 300 may be used to construct network nodes for a three-dimensional, dual-rail network. In addition, switch package 300 may interconnect with other similarly configured switch packages 300 to form a three-dimensional, mesh network architecture. The three-dimensional, mesh network architecture may have individual switch nodes 350a, 350b, 304a, and 304b extending theoretically in positive and negative directions along three orthogonal axis, X, Y, and Z. To illustrate, in some embodiments, switch 304b may communicate with four other switches in a theoretical X-Y plane using interfaces 312a, the four other switches residing in one or more other similarly configured switch packages 300. Switch 304a may also communicate with switch 304b and 350a in a theoretical positive and negative Z direction respectively. Up to six of the remaining switch ports of switch 304b may be used to connect to six clients 102 through interfaces 312d.

In various other embodiments, switch package 300 may interconnect with other similarly configured switch packages 300 to form two-dimensional network architecture. The two-dimensional network architecture may have individual switch nodes 350a, 350b, 304a, and 304b extending theoretically in positive and negative directions along two orthogonal axis, X and Y. To illustrate, in some embodiments, switch 304b may communicate with four switches in a theoretical X-Y plane, two of the four switches 350b and 304a internal to switch package 300, and the other two switches residing in one or more other similarly configured switch packages 300. In such embodiments, the communication between switch packages 300 may be effected, for example, using two 12X Infiniband connectors for each of the interfaces 312c, 312d, 312e, and 312f; however, other types and/or numbers of interfaces may be used. In addition, the communication between each switch package 300 and up to forty-eight respectively coupled client nodes 102 may be effected using, for example, up to sixteen twelve 12X Infiniband connectors for each of the interfaces 312a, 312b, 312g, and 312h; however, other types and/or numbers of interfaces may be used. In such a configuration, half of the network connections are internal to switch packages 300. Since the physical size of a switch enclosure is typically determined by the space required for the interfaces, such embodiments reduce the overall size of switch package 300 by a factor of two. In addition, in various embodiments, such two-dimensional network architecture can be linearly scaled to almost any size while minimizing the length of interconnecting cables. This is very desirable for Double Data Rate and Quad Data Rate networks, where long copper cables are not an option and fiber optic connections are very expensive.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for networking a computer cluster, comprising:
   communicatively coupling together each of a plurality of client nodes through one or more switches, each switch comprising a plurality of switch ports;
   positioning at least two of the one or more switches on a common circuit board of a switch package;
   electrically interconnecting directly to one another at least a first subset of the plurality of switch ports of the at least two of the one or more switches within the switch package such that the at least two of the one or more switches can communicate with one another within the switch package; and
   electrically connecting, for each of the at least two of the one or more switches, at least a second subset of the plurality of switch ports to corresponding external interfaces of the switch package to allow the switch package to communicate externally.

2. The method of claim 1, and further comprising providing the switch package with a plurality of interfaces, at least two of the plurality of interfaces disposed on opposite sides of the switch package.

3. The method of claim 1, and further comprising:
   providing the switch package with at least one modular card receptor; and
   coupling a modular card to each of the at least one modular card receptor.

4. The method of claim 3, and further comprising interconnecting a plurality of the switch packages to form a multi-dimensional network architecture.

5. The method of claim 4, wherein the multi-dimensional network architecture is selected from the group consisting of:
   two-dimensional;
   three-dimensional;
   two-dimensional, dual-rail; and
   three-dimensional, dual-rail.

6. The method of claim 1, and further comprising:
   providing a plurality of the switch packages;
   routing each of the communication paths through at least one of the plurality of switch packages.

7. The method of claim 6, and further comprising:
   mounting at least a subset of the plurality of switch packages within an equipment rack; and
   mounting at least one of the plurality of client nodes within the equipment rack.

8. The method of claim 7, and further comprising:
   communicating between the at least one of the plurality of client nodes and at least one switch package of the at least a subset of the plurality of switch packages at a first bandwidth; and
   communicating between the at least one switch package of the at least a subset of the plurality of switch packages and at least one other switch package of the at least a subset of the plurality of switch packages at a second bandwidth greater than the first bandwidth.

9. The method of claim 8, wherein communicating at a second bandwidth comprises communicating using a communication link from the group consisting of:
   Infiniband;
   Infiniband Double Data Rate;
   Infiniband Quad Data Rate; and
   10 GigE.

10. A modular computer network switch package, comprising:
   a motherboard;
   a plurality of interfaces coupled to the motherboard;
   a plurality of switch receptors coupled to the motherboard;
   one or more daughter card receptors coupled to the motherboard;
   one or more first conduction conduits coupled to the motherboard, each first conduction conduit communicatively coupling each of the plurality of switch receptors with each other of the plurality of switch receptors;
   one or more second conductive conduits coupled to the motherboard, each second conductive conduit communicatively coupling each switch receptor with at least a subset of the plurality of interfaces;
   one or more third conductive conduits coupled to the motherboard, each third conductive conduit communicatively coupling each switch receptor with each of the one or more daughter card receptors; and
   one or more fourth conductive conduits coupled to the motherboard, each fourth conductive conduit communicatively coupling the one or more daughter card receptors with at least a subset of the plurality of interfaces.

11. The computer network switch package of claim 10, and further comprising a plurality of switches each coupled to respective ones of the plurality of switch receptors.

12. The computer network switch package of claim 10, and further comprising one or more daughter cards each coupled to respective ones of the one or more daughter card receptors.

13. The computer network switch package of claim 12, wherein each daughter card of the one or more daughter cards comprises:
   one or more switch receptors; and
   one or more switches each coupled to a respective one or more switch receptors.

14. The computer network switch package of claim 13, wherein the motherboard and each of the one or more daughter cards are capable of mounting within a 1U enclosure of an equipment rack.

15. The computer network switch package of claim 10, wherein at least one of the plurality of interfaces is capable of connecting to a commodity computer, the commodity computer capable of mounting within the equipment rack.

16. The network switch package of claim 10, wherein a first subset of the plurality of interfaces supports the use of network connections and a second subset of the plurality of interfaces supports the use of client node connections.

17. The computer network switch package of claim 16, wherein at least one interface of the first subset of the plurality of interfaces is capable of supporting a greater bandwidth than at least one interface of the second subset of the plurality of interfaces.

18. The computer network switch package of claim 16, wherein the first subset of the plurality of interfaces supports a connection selected from the group consisting of:
   Infiniband;
   Infiniband Double Data Rate;
   Infiniband Quad Data Rate; and
   10 GigE.

19. The computer network switch package of claim 16, wherein at least one interface of the first subset of the plurality of interfaces is disposed on an opposite side of the switch package from at least one interface of the second subset of the plurality of interfaces.

20. A computer cluster network, comprising:
   a plurality of client nodes communicatively coupled together through a network fabric, the network fabric comprising one or more modular switch packages, each modular switch package comprising:
   a motherboard;
   a plurality of interfaces coupled to the motherboard, at least two of the plurality of interfaces disposed on opposite sides of the switch package;
   a plurality of switch receptors coupled to the motherboard;
   one or more daughter card receptors coupled to the motherboard;
   one or more first conduction conduits coupled to the motherboard, each first conduction conduit communicatively coupling each of the plurality of switch receptors with each other of the plurality of switch receptors;
   one or more second conductive conduits coupled to the motherboard, each second conductive conduit communicatively coupling each switch receptor with at least a subset of the plurality of interfaces;
   one or more third conductive conduits coupled to the motherboard, each third conductive conduit communicatively coupling each switch receptor with each of the one or more daughter card receptors; and
   one or more fourth conductive conduits coupled to the motherboard, each fourth conductive conduit communicatively coupling the one or more daughter card receptors with at least a subset of the plurality of interfaces;
   a plurality of switches each coupled to respective ones of the plurality of switch receptors, and each switch having a plurality of switch ports;
   wherein at least a subset of the plurality of switch ports is directly coupled to one or more of the plurality of client nodes; and
   one or more daughter cards each coupled to respective ones of the one or more daughter card receptors.

* * * * *